(12) United States Patent
Gonzalez et al.

(10) Patent No.: US 11,262,729 B2
(45) Date of Patent: Mar. 1, 2022

(54) ADAPTING A 3D PRINTING FILE

(71) Applicant: HEWLETT-PACKARD DEVELOPMENT COMPANY, L.P., Houston, TX (US)

(72) Inventors: Sergio Gonzalez, Sant Cugat del Valles (ES); Jordi Sanroma, Sant Cugat del Valles (ES); Jordi Gonzalez, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 425 days.

(21) Appl. No.: 16/094,575

(22) PCT Filed: May 12, 2016

(86) PCT No.: PCT/EP2016/000779
§ 371 (c)(1),
(2) Date: Oct. 18, 2018

(87) PCT Pub. No.: WO2017/194072
PCT Pub. Date: Nov. 16, 2017

(65) Prior Publication Data
US 2020/0326682 A1    Oct. 15, 2020

(51) Int. Cl.
    *G05B 19/4099*    (2006.01)
    *B33Y 50/00*    (2015.01)
    *B29C 64/386*    (2017.01)

(52) U.S. Cl.
    CPC ........ *G05B 19/4099* (2013.01); *B29C 64/386* (2017.08); *B33Y 50/00* (2014.12); *G05B 2219/49023* (2013.01)

(58) Field of Classification Search
CPC ...... G05B 19/4099; G05B 2219/49023; B33Y 50/00; B29C 64/386; G06T 17/20; G06T 11/60
See application file for complete search history.

(56) References Cited

U.S. PATENT DOCUMENTS 8,175,734 B2    5/2012    Fogel et al.
2013/0297059 A1    11/2013    Grifith et al.
(Continued)

OTHER PUBLICATIONS

Angus Johnson, "Clipper—an open source freeware library for clipping and offsetting lines and polygons", www.angusj.com/delphi/clipper.php, Oct. 15, 2015 (Oct. 15, 2015), pp. 1-4, retrieved on Jan. 4, 2017 from :http://web.archive.org (Year: 2015).*

(Continued)

*Primary Examiner* — Thomas C Lee
*Assistant Examiner* — Michael Tang
(74) *Attorney, Agent, or Firm* — HP Inc. Patent Department

(57) ABSTRACT

A method is described in which a 3MF (3D Manufacturing Format) file is adapted for use with a three-dimensional (3D) printing system. The 3MF file includes at least one 3D model having polygonal slices. The method comprises parsing the 3MF file, generating an intermediate file for the 3D model included in the 3MF file, and performing a polygon cleanup for the polygonal slices of the 3D model of the intermediate file. The polygon cleanup is performed using an implementation of a polygon clipping algorithm. Further, the method comprises generating a resulting file for the intermediate file comprising the polygonal slices for which the polygon cleanup has been performed.

20 Claims, 3 Drawing Sheets

(56) References Cited

U.S. PATENT DOCUMENTS

| | | | | |
|---|---|---|---|---|
| 2014/0259048 A1* | 9/2014 | Brueck | ............... | H04N 21/812 |
| | | | | 725/32 |
| 2015/0005919 A1* | 1/2015 | McGatha | .............. | B29C 64/393 |
| | | | | 700/119 |
| 2015/0029187 A1* | 1/2015 | Nakamura | .............. | G06T 19/20 |
| | | | | 345/420 |
| 2015/0142152 A1 | 5/2015 | Rezayat | | |
| 2015/0269290 A1* | 9/2015 | Nelaturi | ................. | G06T 17/10 |
| | | | | 703/6 |
| 2016/0110917 A1 | 4/2016 | Iverson | | |
| 2017/0284676 A1* | 10/2017 | North | ................ | B23K 15/0026 |

OTHER PUBLICATIONS

Heath; "3D Printing; Hardware and Software for the Consumer Market"; IJSRTM; vol. 3, No. 8; 2015.

Angus Johnson; "Clipper—an open source freeware library for clipping and offsetting lines and polygons"; Oct. 16, 2014; (cont. from above) www.angusj.com/delphi/clipper/documentation/Docs/Overview/_Body.htm; retrieved Jan. 4, 2017.

Vatti; "A Generic Solution to Polygon Clipping"; Communications of the ACM; vol. 35, No.; Jul. 1, 1992; pp. 56-63.

* cited by examiner

ADAPTING A 3D PRINTING FILE

BACKGROUND

The description is related to a three dimensional (3D) printing method and system. Three-dimensional (3D) printing is an additive printing process used to make three-dimensional solid objects from a digital 3D model. More particularly, the description is related to a method and system for adapting a 3D printing file for use with a 3D printing system.

BRIEF DESCRIPTION OF THE DRAWINGS

Examples will be described, by way of example only, with reference to the accompanying drawings in which corresponding reference numerals indicate corresponding parts and in which.

DETAILED DESCRIPTION

Figure 1:
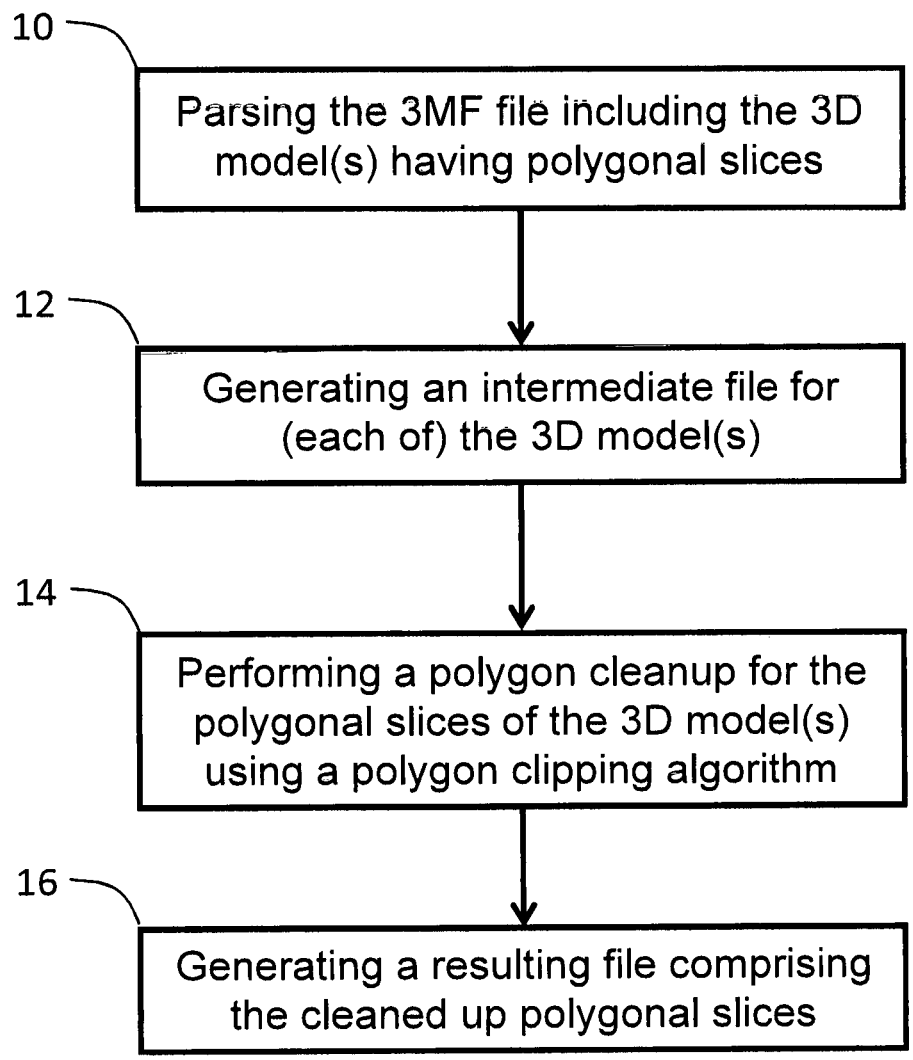
FIG. 1 is a block diagram of an example method for adapting a 3D printing file by a 3D printer according to an example.

In general, 3D printing is also known as additive manufacturing because it involves the combined application of successive layers of material. In general with regard to 3D printing, the term "material" is to be understood in the sense of a physical substance that can be used to generate an object. 3D printing is a process of making a three-dimensional solid or physical object of virtually any shape from a digital 3D model defined primarily in a certain format. As used herein, the term "3D model" refers to the object or objects to be created via 3D manufacturing processes during a printing operation. It may include a single object, multiple homogenous objects, multiple heterogeneous objects, an object fully enclosed in another object, or multiple objects in an interlocked and inseparable assembly.

3D printing comprises a group of technologies with a common characteristic of adding material to form an object, i.e. the object may be created by laying down successive layers of material until the entire object is created. There are widespread technology solutions such as Stereolithography (SLA), Digital Light Processing (DLP), Continuous Liquid Interface Production (CLIP), Direct Metal Laser Sintering (DMLS), Selective Deposition Lamination, Fused Deposition Modeling (FDM) and Selective Laser Sintering (SLS), using a large number of materials (e.g. sand, cements, ceramics, textiles, biomaterials, glass, resins or plastics). In general, with regard to 3D printing, the term "material" is to be understood in the sense of a physical substance that can, be used to output an object.

In some examples, a 3D printing file may be provided to a 3D printing system. The 3D printing file may be any kind of software processed on a computer device. In some examples, the 3D printing file may be processed by the 3D printing system. In some other examples, the 3D printing file may be processed by a separate computer device. For example, processing a 3D printing file by a 3D printing system may depend, amongst other things, on the structure of the 3D printing file and a processor used in the 3D printing system. In some examples, a 3D printing file may be processed by the 3D printer, i.e. the 3D printing file may be processed in a pre-printing process and a physical object is printed during the actual 3D printing process.

Unless specifically stated otherwise, terms such as "processing", "computing", "calculating", "determining", or the like, refer to the action and/or processes of a computer device that manipulates and/or transforms data into other data, said data represented as physical, e.g. such as electronic, quantities. The term "computer device" should be expansively construed to cover any kind of electronic device with data processing capabilities, including, by way of non-limiting example, personal computers, servers, computing systems, communication devices, processors (such as, e.g. digital signal processors (DSP), microcontrollers, field programmable gate arrays (FPGA), application specific integrated circuit (ASIC), etc.) and other electronic computing devices. Also, operations in accordance with the teachings herein may be performed by a computer device specially constructed for the desired purposes or by a general purpose computer device specially configured for the desired purpose by a computer program stored in a computer readable storage medium.

In some examples, processing a 3D printing file by a 3D printer may include generating a 3D representation of one or more objects to be printed, i.e. a 3D model. It may also comprise printing or manufacturing the object itself by the 3D printer. In some examples, the 3D model may be generated by the 3D printing system. In some other examples, the 3D model may be generated on a separate computer system. In some examples, at least one 3D model is already included in the 3D printing file to be processed.

In some examples, the 3D printing file may include at least one 3D model, i.e. the 3D model data, wherein the 3D printing file may have a specific file format suitable for 3D printing. The 3D printer may process the 3D printing file including the at least one 3D model, i.e. instructions may be generated and the physical object may be reconstructed. Processing may be understood herein as the processing taking place before the actual printing process. In some examples, processing comprises also the actual printing process of a physical 3D object.

In some examples, the format of the 3D printing file including the at least one 3D model may be based on an Open Packaging Conventions standard. The Open Packaging Conventions standard is a specification that describes a packaging model, i.e. how the package (e.g. the 3D printing file) is represented with parts and relationships.

In some examples, the 3D printing file may have a format that is based on the 3D Manufacturing Format standard. The 3D Manufacturing Format (3MF) may define one or more 3D objects intended for output to a physical form by a 3D printer. 3MF is a format that allows to send full fidelity 3D models from producing applications to 3D printers, platforms and services. 3MF implements the common package features specified by the Open Packaging Conventions specification. That is, the 3D printing file having the 3MF format may follow the Open Packaging Conventions. The 3D printing file having the 3MF format may represent at least one 3D model. Thus, a 3D printing file that implements the 3MF format includes information on how to generate a physical object through additive manufacturing techniques. For more details on the 3MF file format, reference is made to "3D Manufacturing Format—Core Specification & Reference Guide (version 1.1), Copyright 3MF Consortium 2015".

In some examples, 3D printers may be able to produce correct 3D physical objects given that they are fed with valid printable 3D models. In some examples, such 3D models are represented as, e.g., polygonal meshes. A polygon mesh is a collection of vertices, edges and faces, defining the shape of a polyhedral 3D object. In some examples, the faces may comprise triangles, quadrilaterals, or other convex polygons, since this simplifies rendering. In some examples, the faces may also be composed of more general concave polygons, polygons with holes, and the like. In some examples, these polygonal meshes may be in the SLA (Stereolithography) file format, or any other suitable data format.

A valid model represented as a polygonal mesh may comprise an arbitrary set of polygons that represent a closed 2D-manifold, i.e. a watertight object with substantially no artifacts, such as self-intersections, or a collection of closed 2D-manifolds that substantially do not intersect each other. A valid printable model satisfies additional requirements imposed by various printing devices (different printing devices impose different requirements, as they are based on different technologies).

In some examples, the 3D model(s) included in the 3D printing file comprises a number of polygonal slices, i.e. of 2D slices comprising the polygonal cross sections of the object represented by the 3D model.

In some examples, polygonal meshes may overlap or self-intersect. Therefore, a filling rule may be defined to indicate what enclosed areas are inside the volume of the 3D object and which are outside the volume of the 3D object. The enclosed volume of a group of polygonal meshes may be defined by applying a fill algorithm. Fill algorithms determine how the intersecting areas of geometric shapes are combined to form a region. A fill rule may be defined identically in 2D as in 3D, so the examples herein will show the 2D equivalent for simplicity of figures. This fact may allow to apply the fill rule after slicing, thereby simplifying the algorithm by operating in 2D. By convention, a 2D figure has positive area when wound counter-clockwise, so when looking along an edge, the local "outside" is to the right, equivalent to the local "outside" of a triangle being the direction of the normal.

In some examples, the 3MF file format may define a slice extension. This extension allows providing the models of the objects to be printed as a stack of polygonal slices instead of a polygonal mesh. In some examples, it may allow having polygon intersections and may define slices as plain, non-hierarchical list of polygons. In some examples, it may define a filling rule referred to as "Positive fill rule".

The Positive fill rule determines the "insideness" of a point by drawing a ray from the point to infinity in any direction and then examining the places where it crosses the shape. Starting with a count of zero, add one each time the ray passes from the local "inside" to the local "outside" and subtract one for vice-versa. After counting the crossings, if the result is one or greater, then the point is globally inside the volume; otherwise, it is outside. The Positive fill rule may not be supported by all available renderers, e.g. 3D printing systems.

Thus, a method and system is provided for adapting a 3D printing file including at least one 3D model for use with a 3D printing system. More particular, a method and system is provided for adapting a 3D printing file in the 3MF file format which includes at least one 3D model having polygonal slices is provided. In some examples, the 3MF file may generate the 3D model(s) when being processed by a computer device or by the 3D printing system.

The method for adapting a 3D printing file including at least one digital 3D model may be implemented into any 3D printing system or manufacturing device, such as 3D printers.

The method comprises parsing the 3MF file and generating, based on the content of the 3MF file, an intermediate file for each of the 3D models included in or generated by the 3MF file. In some examples, the 3D model is comprised of polygonal slices. The method further comprises performing a polygon cleanup for the polygonal slices of the 3D model(s) included in the 3MF file. In some examples, a polygon cleanup is performed for each polygonal slice of each of the 3D model(s). In some examples, a polygon cleanup is limited to some polygonal slices of at least one 3D model. For example, a polygon cleanup may be performed for those polygonal slices, which comprise one or more of polygon auto-intersections, polygons which are completely or partially inside of polygons of the same or of a different type (e.g. two solid polygons, two hole polygons, or one solid and one hole polygon), intersections between two or more polygons. The polygon cleanup is performed using an implementation of a polygon clipping algorithm. In some examples, the implemented polygon clipping algorithm is a Vatti clipping algorithm. The method further comprises generating a resulting file which comprises at least the polygonal slices for which a polygon cleanup has been performed. In some examples, the resulting file may comprise all polygonal slices of a 3D model. In some examples, the resulting file may be generated by updating the intermediate file with the corresponding polygonal slices for which the polygon cleanup has been performed. Further, a 3D printing system for applying the method and a computer-readable medium for storing a program causing a computer processor to perform the method are provided.

FIG. 1 illustrates an example method for adapting a 3MF file which includes at least one 3D model for use with a 3D printing system. The at least one 3D model comprises polygonal slices.

As shown in block 10 in FIG. 1, an example method of adapting a 3MF file includes parsing the 3MF file to obtain the 3D model data representing the 3D object to be printed. In some examples, the 3MF file further includes additional content, such as, e.g., a header. The information included, for example, in the header may also be obtained by parsing the 3MF file.

Further, as shown in block 12 in FIG. 1, an intermediate file is generated for each 3D model included in the 3MF file that has been parsed. The intermediate file may be used for passing information to a processing component, i.e. to the component which performs the example method described herein. In some examples, information on the 3D model is passed to the processing component. In some examples, further information, for example information contained in the header of the 3MF file, is passed to the processing component.

In some examples, the processing component may be a 3D printing system. In some examples, the 3D printing system may comprise a processor. In some other examples, the processing component may be a separate computer device.

It is appreciated that, although in the example method described herein a corresponding intermediate file is generated for each 3D model separately, it may also be possible that an intermediate file is generated for a number of 3D models, e.g. for two or more 3D models.

In some examples, the intermediate file has a binary format. In some examples, the polygonal slices of the corresponding 3D model(s) may be stored with 3D coordinates in the intermediate file. That is, the polygonal slices may be stored, for example, with Cartesian coordinates, which are usually labelled as X, Y and Z, wherein the X and Y coordinates represent the plane of the slice and the Z coordinate for all polygons of the same slice is equal to the Z coordinate of that slice within the represented 3D model. The Cartesian coordinates specified herein may be based on a right-handed Cartesian coordinate space. That is, the origin of the coordinate space may be mapped to the bottom-front-left corner of the 3D printing system's output field (such as, e.g. a tray, a platform, a bed, or the like), with the x-axis increasing to the right of the output field, the y-axis increasing to the back of the output field, and the z-axis increasing to the top of the output field.

As used herein, the term top may refer to the XY plane of the coordinate space with the maximum printable Z value. The term bottom may refer to the minimum printable XY plane of the coordinate space, defined as the XY plane with a Z value of zero. This is typically coincident with the print bed surface. The term left may refer to the minimum printable YZ plane of the coordinate space, defined as the YZ plane with an X value of zero. The term right may refer to the YZ plane of the coordinate space with the maximum printable X value. The term front may refer to the minimum printable XZ plane of the coordinate space, defined as the XZ plane with a Y value of zero. The term back may refer to the XZ plane of the coordinate space with the maximum printable Y value.

In block 14 in FIG. 1, a polygon cleanup is performed for the polygonal slices of the 3D model(s) of each intermediate file. In the example method described herein, the polygon cleanup is performed for a stack of polygonal slices of a 3D model of an intermediate file. That is, instead of cleaning up the polygons slice by slice, all slices of a 3D model may be cleaned up.

As explained above, in some examples the 3MF file may be in a format having a slice extension. The slice extension allows providing the 3D models of the objects to be printed as a stack of polygonal slices, instead of a polygonal mesh. In order to relax constrains that 3MF file producers may fulfill, it allows having polygon intersections and defines slices as plain, non-hierarchical list of polygons. To allow the unique definition of slice content with this constrain relaxation, it may define a non-common polygon fill rule, the Positive fill rule. This Positive fill rule may not be supported by all of the available 3D printing systems.

As used herein, a fill rule (or sometimes called filling rule) is an algorithm used to determine whether any particular point is considered to be "inside" the geometry of the 3D model representing the object or not.

Figure 2:
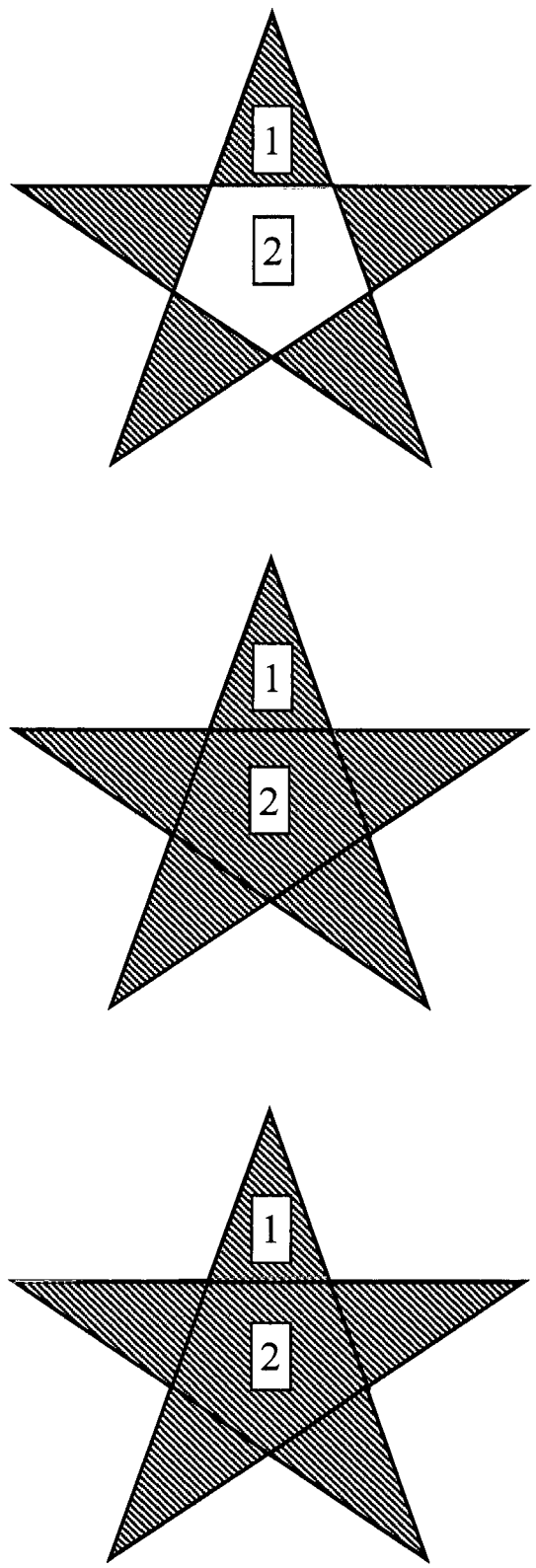
FIG. 2 illustrates an Even-Odd filling rule (top), a Non-Zero filling rule (center) and a Positive filling rule (bottom) according to an example.

In some examples, the 3D printing system may use an Even-Odd fill rule. This means that while the rendering process, it renders the image row by row, evaluating the intersection of polygon edges with the rendered row. Then, after each intersection with a polygon edge, it makes a transition from solid (part) to blank (hole), and the other way around subsequently. The Even-Odd fill rule determines the "insideness" of a point on the slice by drawing a ray from that point to infinity in any direction and counting the number of path segments from the given shape that the ray crosses. If this number is odd, the point is inside; if even, the point is outside (as illustrated in FIG. 2, top).

In some examples, the 3D printing system may use a Non-Zero fill rule. Generally, the Non-Zero fill rule is a means of determining whether a given point falls within an enclosed curve. Unlike the similar even-odd rule, it relies on knowing the direction of stroke for each part of the curve. The Non-Zero fill rule determines the "insideness" of a point on the canvas by drawing a ray from that point to infinity in any direction and then examining the places where a segment of the shape crosses the ray. Starting with a count of zero, add one each time a path segment crosses the ray from left to right and subtract one each time a path segment crosses the ray from right to left. After counting the crossings, if the result is zero then the point is outside the path. Otherwise, it is inside (as illustrated in FIG. 2, center).

In some examples, the 3D printing system may use a Positive fill rule, which determines the "insideness" of a point by drawing a ray from the point to infinity in any direction and then examining the places where it crosses the shape. Starting with a count of zero, add one each time the ray passes from the local "inside" to the local "outside" and subtract one for vice-versa. After counting the crossings, if the result is one or greater, then the point is globally inside the volume; otherwise, it is outside. The main difference to the other two filling rules is that for rendering each slice, the polygons from the full slice need to be considered, while for the others a local evaluation of a subset of edges may be sufficient, i.e. the ones intersecting the current row (as illustrated in FIG. 2, bottom).

In some examples, the same output may be produced by using any one of the above elucidated filling rules. In particular, these may be simple cases, i.e. those in which there are no polygon intersections nor self-intersection. In such cases, the "Even-Odd" filling rule may produce the same output as the "Positive" filling rule.

In some other examples, this is not the case. In particular, there are three kinds of situations, in which the output may not be the same:

Polygon auto-intersections;

Polygons which are completely inside of polygons of the same type (two solid polygons, or two hole polygons) or of different types; and Intersection between two or more polygons.

In these cases, the polygon cleanup may be performed. In some examples, the intermediate file is passed to a Model Cleaner component. This component may perform the polygon cleanup. In some examples, it uses an implementation of a polygon clipping algorithm. In some examples, the Vatti clipping algorithm is implemented. As a result, polygon intersections may be suppressed by merging polygons, and/or polygon auto-intersection may be suppressed by splitting polygons.

According to the example method, in block 16, a resulting file is generated which comprises the cleaned up polygonal slices. In some examples, the resulting file may be a separate new file that is generated by the computer device performing the example method described herein. In some other examples, the previous intermediate file including the stack of polygonal slices for which the polygonal cleanup has been performed is updated with the cleaned up polygonal slices. The resulting file then corresponds to the updated intermediate file.

In some examples, after the resulting file has been generated the polygon slice stack comprising the cleaned up polygons is processed. In general, the processor may split the slice stack in a single file per slice. Each slice file contains the cleaned polygons for the slice. The processor also may perform a coordinate transformation, converting the polygons to printing pixels coordinates, which define the exact location where the polygon will be printed.

Once the Processor has finished, the content of the slice files may be ready to be printed by a 3D printing system. In some examples, the 3D printing system, may be able to render following the "Even-Odd" filling rule for each slice to be printed, given that the problematic polygons have been removed. In addition, on average the cleanup may have reduced the number of polygons per slice, making the processing time of the slice faster, as it is directly related with the number of edges on the slice.

The proposed solution may enable the use of a common 3D printing system, making it suitable for printing content from 3MF polygonal slices. Also, it may reduce the processing time for rendering a layer while printing by reducing the total amount of polygons contained in the slice. As the render of slice occurs at printing time, which is a time-sensitive operation because a delay on the renderer may cause a loss of mechanical properties on the produced parts, speeding this up will make less probable the occurrence of such delays.

Figure 3:
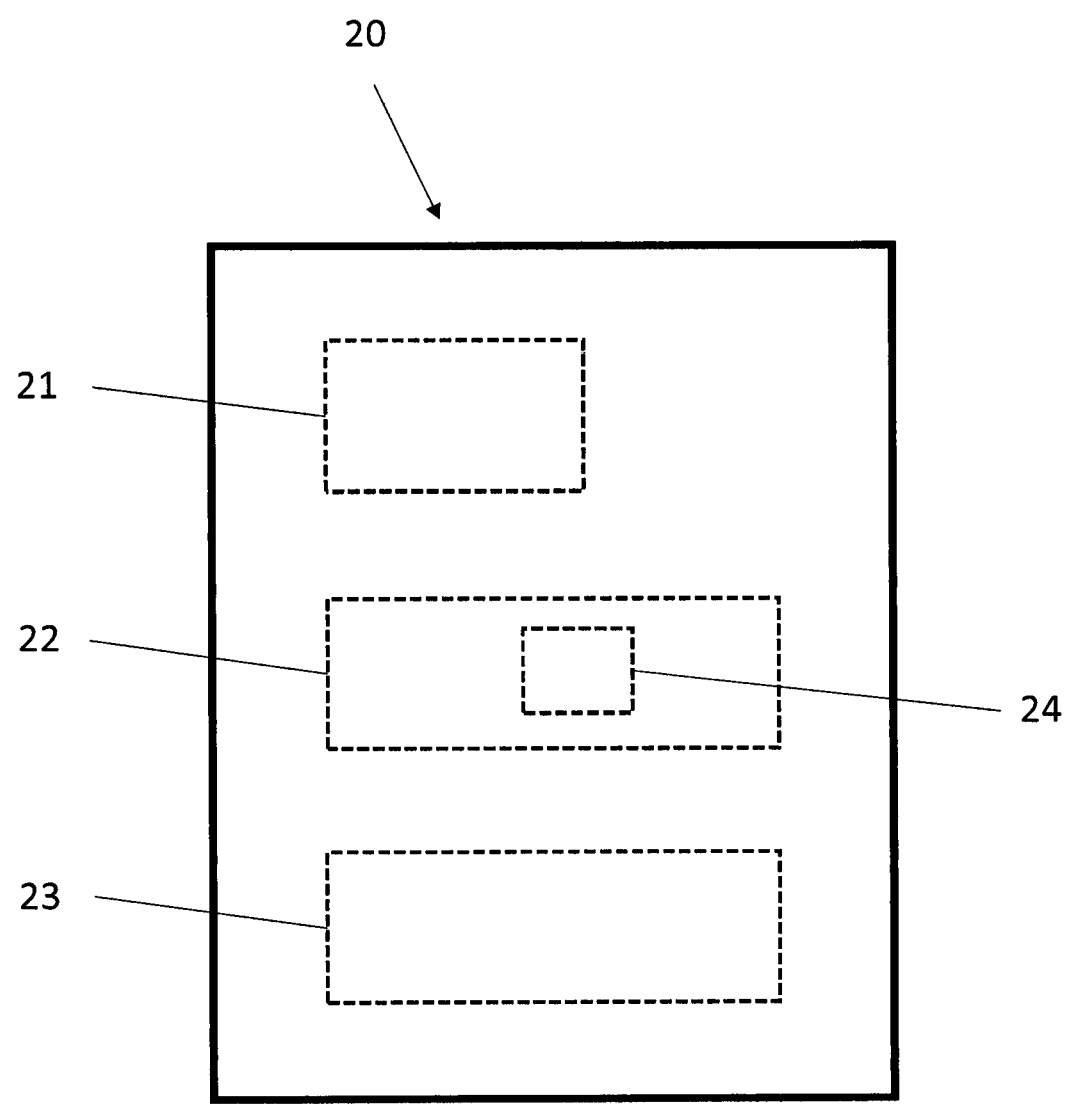
FIG. 3 is a block diagram of an example 3D printer.

Now referring to FIG. 3, which illustrates a block diagram of an example 3D printer 20 comprising a processor 21, a machine-readable storage medium 22 and a print mechanism 23. The storage medium 22 includes, among other data and programs, an input file 24 (e.g. the 3D printing file that represents a ZIP package). The 3D printer 20 may be particularly configured to perform the processes described herein. In some examples, the processor 21 may perform the input file 24 being stored in the storage medium 22, wherein the input file 24 includes the example method for processing a 3D printing file by the 3D printer 20, according to the example method described in FIG. 1. In some examples, the 3D printer 20 may be controlled by a personal computer that also may include a processor and a storage. Communication between the personal computer and the printer may be established through a network connection.

Machine-readable storage medium 22 may be any electronic, magnetic, optical, or other physical storage device that stores executable instructions. Thus, machine-readable storage medium 22 may be, for example, Random Access Memory (RAM), an Electrically-Erasable Programmable Read-Only Memory (EEPROM), Flash Memory, a storage drive, an optical disc, and the like.

While several examples have been described in detail, it is to be understood that the disclosed examples may be modified. Therefore, the foregoing description is to be considered non-limiting.

What is claimed is:

1. A method of adapting a 3MF (3D Manufacturing Format) file which includes at least one 3D model having polygonal slices for use with a three-dimensional (3D) printing system, comprising:
   parsing the 3MF file;
   generating an intermediate file for the 3D model included in the 3MF file;
   performing a polygon cleanup for the polygonal slices of the 3D model of the intermediate file using an implementation of a polygon clipping algorithm; and
   generating a resulting file for the intermediate file comprising the polygonal slices for which the polygon cleanup has been performed.

2. The method of claim 1, wherein generating a resulting file comprises updating the intermediate file with the corresponding polygonal slices for which the polygon cleanup has been performed.

3. The method of claim 1, wherein the resulting file has a binary file format and stores the polygonal slices with 3D coordinates as a slice stack.

4. The method of claim 3, further comprising:
   processing the resulting file, thereby generating a slice file for each slice of the slice stack included in the resulting file.

5. The method of claim 4, further comprising
   transforming the coordinates of the polygonal slices to printing pixel coordinates.

6. The method of claim 1, wherein the polygon clipping algorithm is a Vatti clipping algorithm.

7. The method of claim 1, wherein the polygon cleanup suppresses polygon intersections by merging polygons.

8. The method of claim 1, wherein the polygon cleanup suppresses polygon auto-intersections by splitting polygons.

9. The method of claim 1, wherein the 3MF file is in a format having the slice extension, which defines a Positive filling rule.

10. The method of claim 9, wherein the polygon cleanup allows the 3D printing system to use an Even-Odd filling rule.

11. The method of claim 9, wherein the polygon cleanup allows the 3D printing system to use a Non-Zero filling rule.

12. The method of claim 1, wherein the polygon cleanup is performed for a subset of polygonal slices of the 3D model.

13. The method of claim 12, wherein the subset of polygonal slices for which polygon cleanup is performed comprises polygons which are completely inside another polygon.

14. The method of claim 12, wherein the subset of polygonal slices for which polygon cleanup is performed is determined based on polygon type.

15. The method of claim 1, wherein the polygonal slices are stored as Cartesian coordinates in the intermediate file.

16. The method of claim 1, further comprising reducing the number of polygons per polygonal slice.

17. The method of claim 1, wherein parsing the 3MF file, generating the intermediate file, performing the polygon cleanup, and generating the resulting file are performed during printing.

18. A three-dimensional (3D) printing system, comprising a processor, wherein the processor is to:
   parse a 3MF file including at least one 3D model having polygonal slices;
   generate an intermediate file for the 3D model included in the 3MF file;
   perform a polygon cleanup for the polygonal slices of the 3D model of the intermediate file using an implementation of a polygon clipping algorithm; and
   generate a resulting file for the intermediate file comprising the polygonal slices for which the polygon cleanup has been performed by replacing portions of the intermediate file for which polygon cleanup has been performed with cleaned up polygon slices.

19. The 3D printing system of claim 18, wherein the processor is to print the object based on the resulting file.

20. A non-transitory computer readable medium for storing a program causing a processor to perform a method of adapting 3MF (3D Manufacturing Format) polygonal slices for a three-dimensional (3D) printing system, the non-transitory computer readable medium comprising:
   instructions to parse a 3MF file which provides a model of an object as a stack of polygonal slices and implements a Positive fill rule;
   instructions to generate an intermediate file for the 3D model included in the 3MF file;
   instructions to perform a polygon cleanup for the polygonal slices of the 3D model of the intermediate file using an implementation of a polygon clipping algorithm to adapt the 3MF file into a file to support at least one of an Even-Odd fill rule and a Non-Zero fill rule;

instructions to generate a resulting file for the intermediate file comprising the polygonal slices for which the polygon cleanup has been performed by replacing portions of the intermediate file for which polygon cleanup has been performed with cleaned up polygon slices; and instructions to print an object based on the resulting file.

* * * * *